United States Patent
Sundaram et al.

(10) Patent No.: US 12,388,975 B2
(45) Date of Patent: Aug. 12, 2025

(54) METHOD AND SYSTEM OF VIDEO CODING WITH EFFICIENT INTRA BLOCK COPYING

(71) Applicant: Intel Corporation, Santa Clara, CA (US)

(72) Inventors: Vijay Sundaram, Sunnyvale, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 824 days.

(21) Appl. No.: 17/358,684

(22) Filed: Jun. 25, 2021

(65) Prior Publication Data

US 2021/0321093 A1 Oct. 14, 2021

(51) Int. Cl.
*H04N 19/105* (2014.01)
*H04N 19/11* (2014.01)
*H04N 19/119* (2014.01)
*H04N 19/176* (2014.01)
*H04N 19/593* (2014.01)

(52) U.S. Cl.
CPC .......... *H04N 19/105* (2014.11); *H04N 19/11* (2014.11); *H04N 19/119* (2014.11); *H04N 19/176* (2014.11); *H04N 19/593* (2014.11)

(58) Field of Classification Search
CPC .................................................. H04N 19/105
See application file for complete search history.

(56) References Cited

U.S. PATENT DOCUMENTS

2020/0204819 A1\* 6/2020 Hsieh .................. H04N 19/513
2022/0279185 A1\* 9/2022 Zhu ....................... H04N 19/82

\* cited by examiner

*Primary Examiner* — Jerry T Jean Baptiste
(74) *Attorney, Agent, or Firm* — Essential Patents Group, LLP

(57) ABSTRACT

Methods, articles, and systems of video coding use efficient intra block copying.

23 Claims, 7 Drawing Sheets

- Obtain image data of a frame of a video sequence 402
- Decode previous blocks of a frame 404

Generate IBC search space 406
- Obtain prediction mode of decoded block 408
- Determine if decoded block is to be included in the IBC search space depending on the type of prediction mode of the decoded block 410
- List decoded blocks in an IBC search space buffer 412
- Indicate whether or not the decoded block is to be included in the IBC search space 414

Perform IBC prediction mode search for current block 416
- Obtain current block position, size, and shape 418
- Limit maximum IBC current block size to maximum efficiency size 420
  - Partition large blocks to maximum size 422
- Obtain IBC search space 424
- Exclude immediate left block(s) 426
- Search IBC search space for matching blocks 428

Provide image data of matching block(s) as candidate predictions for intra-prediction 430

METHOD AND SYSTEM OF VIDEO CODING WITH EFFICIENT INTRA BLOCK COPYING

BACKGROUND

A number of video coding standards used specialized techniques to encode synthetic video or synthetic screen content that is different than video captured by a camera. Such screen content may include text on typical office-based applications such as word processors, power points, spread sheets, web pages, still graphics and so forth. Other screen content with large flat or uniform regions that is often different than camera captured video may include animation, games, and so forth. Since such synthetic screen content has large amounts of repeated flat (or uniform) image data that moves in relatively large segments and in relatively large distances from frame to frame versus natural image of video captured by a camera, it has been found that video coding of such synthetic screen content can be performed differently than that used with captured video to increase performance and/or quality. One example of such a codec is the screen content coding (SCC) extension of high efficiency video coding (HEVC). Subsequently, the SCC tools have been added to the baseline functionality of other video coding standards such as Alliance for Open Media video 1 (AV1) to leverage the coding performance advantages for all types of images including natural images.

The SCC tools include an intra-prediction mode referred to as intra block copy (IBC) where the image data of one block on a video frame is copied to another block on the same frame and with the same image data. The search for matching IBC blocks, however, is usually unrestricted so that all or almost all of the previously decoded blocks on a frame are searched to see if one of those previously decoded blocks match a current block on the frame being reconstructed. While the unrestricted search increases the amount of compression so that the number of bits of the image data transmitted for a frame is reduced, the unrestricted search significantly and inefficiently increases the search complexity, and in turn the computational load and power consumption, to compress a single video frame, thereby providing video coding that has lower performance. Also, the IBC process as applied to natural images is very inefficient because natural images are usually so complex that IBC is used on very small portions of the natural image, if at all, such that the use of IBC often does not provide a sufficient increase in compression to be practical.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate the corresponding or analogous elements. In the figures:

FIG. 4 is a detailed flow chart of a method of video coding with efficient intra block copying according to at least one of the implementations herein;

DETAILED DESCRIPTION

Figure 1:
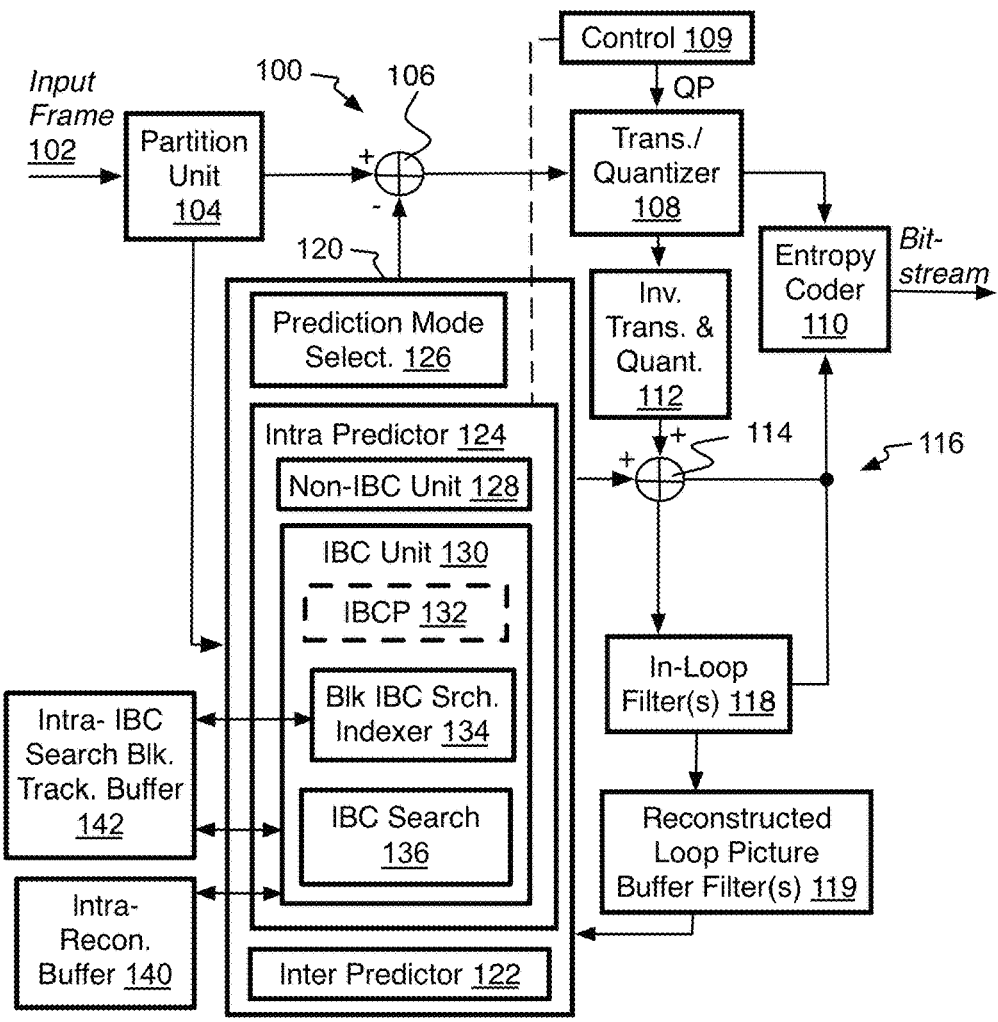
FIG. 1 is a schematic diagram of an encoder according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless specifically specified herein. For instance, various architectures employing, for example, multiple integrated circuit (IC) chips and/or packages, and/or various computing devices, commercial electronic devices such as servers, and/or consumer electronic (CE) devices such as computers, set top boxes, tablets, smart phones, televisions, internet-of-things (IoT) devices with display screens, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods are described below related to video coding with efficient intra block copying according to at least one of the implementations herein. As mentioned, the conventional IBC search for most video coding standards such as HEVC SCC extension or AV1 permits an unrestricted search of close to all previously decoded blocks of the frame. Such an unrestricted search is thorough so that it increases compression but at the cost of increased encoder search complexity, and in turn increased computational load and power consumption to run the searches. Moreover, the unrestricted searches are mostly ineffective for natural content or videos with images captured by cameras where usually a very small percentage of the image can be copied from one area of the image to another. Thus, all of the added complexity of the unrestricted search usually does not improve the quality and compression of the natural images, and the added search complexity is wasteful.

Conventional techniques to attempt to increase performance and lower the encoder computation complexity of the IBC search uses a fixed search area adjacent the prediction block to be reconstructed. For example, the search area may be reduced to a superblock (SB) to the left and a superblock above a superblock to be reconstructed. Such a drastic reduction in search area, however, results in a significant loss in image quality. For example, video coding in the AV1 standard can experience a loss of about 20% to 24% Bjontegaard rate difference (BD-Rate) for webpage content when restricting the IBC search to only the two SBs mentioned, and when compared to an unrestricted search in the previously coded region of the frame. The BD-rate (or Bjontegaard delta rate) is a measure of the compression bitrate reduction offered by a codec or codec feature, while maintaining the same quality as measured by objective metrics. Thus, the BD-rate can be considered a quality measure when maintaining the same target compression rate.

To resolve these issues, the disclosed method and system reduce encoder complexity and perform a "smart" IBC search. This is achieved by identifying the potential areas of an image that most likely would be selected as reference blocks in an IBC search to match a current block being decoded. By one form, only those blocks that were previously decoded by using IBC as the selected or "winner" prediction mode, often among a number of candidate prediction modes, and those blocks where a palette prediction mode was the selected winner prediction mode, will be included in the IBC search area for the current block. These prediction methods were selected for inclusion in the IBC search area because these prediction modes were the most selected when images were synthetic (non-natural) such as images of text, patterns, or computer generated graphics. Synthetic images are the emphasis here because, as mentioned, natural or camera captured images use IBC searches much less than on synthetic images. Other previously decoded blocks in the image that were decoded by using other prediction modes, such as DC, will not be included in the IBC search area. With this arrangement, the present method provides a fairly accurate way to estimate the best potential matching IBC reference blocks ahead of time so that the area of the image used to form the IBC search can be significantly reduced without a significant negative effect on image quality.

The disclosed method and system herein also optionally restricts block sizes for the IBC search to further reduce the computational load. Specifically, it was found that prediction candidates of larger block sizes were also rarely chosen as the IBC winner relative to smaller block sizes. Thus, by limiting the current and reference block sizes for IBC matching to no more than 32×32 pixels in one example, this also substantially reduces computational load and delay, thereby increasing efficiency or performance.

With the arrangements made above for IBC searches, the method and system disclosed here can maintain image quality, and in some cases, even raise image quality, at a lower computational cost, or in other words, with higher efficiency. As shown below, the efficiency impact of the disclosed method is greatest on natural video, gaming, and animation content where IBC winners are rare, and has the least impact for image content with webpages and other text images where a significant percentage of the frame have IBC prediction mode winners. Shown below, testing on AV1 Common Test Conditions (CTC) reveals an overall average encoder speed increase of about 22% with about a 0.8% improvement in YUV BD-Rate when compared to baseline AV1 with conventional IBC. Confirming the conclusion above, when the disclosed method with reduced IBC search area is assessed based on content type, natural video content shows a higher and more significant gain in both speed and quality, whereas screen content clip s trade negligible quality loss for a sizeable encoder speed increase.

Referring to FIG. 1, an example video coding system (or image processing system or encoder) 100 performs the methods of intra prediction disclosed herein, and is arranged to perform at least one or more of the implementations described herein including intra block copying. In various implementations, video coding system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 100 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1(AV1), H.266 (Versatile Video Coding, or VVC) and others. Although system 100 and/or other systems, schemes or processes may be described herein, the present disclosure is not necessarily always limited to any particular video coding standard or specification or extensions thereof except for IBC prediction mode operations where mentioned herein.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the video coding system 100 may be an encoder where current video information in the form of data related to a sequence of video frames may be received to be compressed. By one form, the video sequence is formed of input frames 102 of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The system 100 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame 102, which may be received from other computer applications as mentioned, or may be received from a camera, or may be a mixture of both. The input frames may be frames sufficiently pre-processed for encoding.

The system 100 also may have a prediction partition unit 104, a subtraction unit 106, a transform and quantizer unit 108, a control 109, and an entropy coder 110. The control 109 may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

Figure 2:
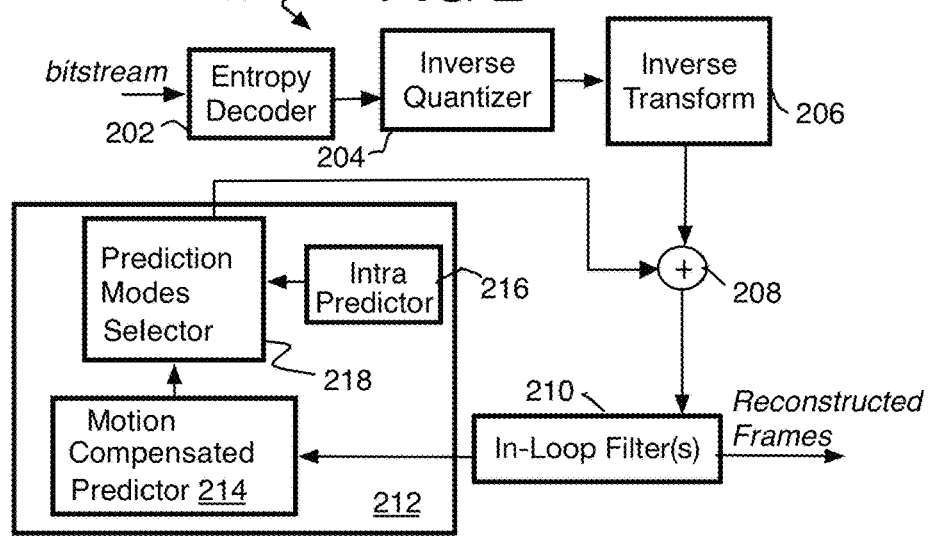
FIG. 2 is a schematic diagram of a decoder according to at least one of the implementations herein.

The output of the quantizer 108 may be provided to a decoding (or decoder) loop or prediction loop 116 to generate the same reference or reconstructed blocks, frames, or other units as would be generated at a decoder such as decoder 200 (FIG. 2). Thus, the decoding loop 116 may use inverse quantization and inverse transform unit 112, adder 114, and residual and prediction assembler units (not shown) to reconstruct the frames. Quality-improving in-loop filter(s) 118 then may be used to revise the frames. A reconstructed loop picture buffer 119 may hold the reconstructed frames to be used as inter-prediction reference frames.

The encoder 100 also has a prediction module 120 that has an inter-prediction unit 122 to perform inter-prediction including motion estimation and motion compensation, an intra-prediction unit 124 to perform the intra-prediction according to the description herein, and a prediction mode selection unit 126.

The intra-prediction unit 124 has an intra block copy (IBC) unit 130 and a non-IBC unit 128 that provides the intra-prediction capability described in more detail below. Both the inter-prediction unit 122 and intra-prediction unit 124 provide candidate predictions to the prediction mode selector 126 that selects the best prediction mode (including intra-modes) for a particular block, typically based on bit-cost and other factors. The prediction mode selector 126 may select an intra-prediction and/or inter-prediction mode when multiple such modes of each may be available. The prediction output of the selector 126 in the form of a prediction block is then provided both to the subtraction unit 106 to generate a residual, and in the decoding loop to the adder 114 to add the prediction to the reconstructed residual from the inverse transform to reconstruct a frame.

More specifically now, the partition unit 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the intra-prediction unit 124 may have an IBC unit 130 that performs the IBC prediction mode and a non-IBC unit 128 that operates any other available intra-prediction mode such as neighbor horizontal, diagonal, or direct coding (DC) prediction mode, palette mode, directional or angle modes, and any other available intra-prediction mode.

The IBC unit 130 either receives partitions from the partition unit 104 or may have operations to form, or receive, its own partition definitions to perform the IBC. Specifically, when an AV1 standard is being used, the prediction partition unit 104 may divide the frames into prediction units for both intra prediction, whether or not IBC, and inter-prediction. This includes dividing a frame into 128×128 or 64×64 super-blocks (SBs). The SBs then may be divided into sub-blocks with available sizes 4×4, 8×8, 16×16, 32×32, 64×64, 4×8, 8×4, 8×16, 16×8, 16×32, 32×16, 32×64, 64×32, 4×16, 16×4, 8×32, 32×8, 16×64, and 64×16. By one optional form as described below, block sizes for the IBC prediction mode may be limited to a certain maximum size, such as 32×32 pixels for efficiency. In this case, larger block sizes may be partitioned to the maximum efficiency size either by the partition unit 104 or by an IBC partition (IBCP) unit 132 of the IBC unit 130.

Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The IBC unit 130 may have a block IBC search indexer unit 134 that selects previously decoded reference blocks to be assigned to the IBC search space, which refers to a 2D area of an image or frame, and also may be referred to as an IBC search area or IBC search region. By one form, this depends on the prediction mode used on the previously decoded block. The blocks of the frame may be listed in an intra-IBC search block tracking buffer (or just IBC search buffer) 142, and an indicator may be provided in the buffer for each block that indicates whether or not the block is part of the IBC search space. By one form, the indicator is a single bit, and the order of the bits in the buffer indicate the order of the blocks on the frame, such as a raster order. At least the image data and/or other representative data such as hashes that may be used to match blocks may be stored in an intra reconstruction buffer 140. For the search itself, the IBC unit 130 may have an IBC search unit 136 that performs the IBC search to match previously decoded reference blocks within the frame to current blocks being decoded.

The IBC search unit 136 may retrieve block addresses from the IBC search buffer 142 and then retrieve the block image data or other intra data from the intra reconstruction buffer 140. Then comparisons may be performed to determine if any of the reference blocks from the search space sufficiently match a current block being reconstructed. This may involve hash matching, SAD search, or other comparison of image data, and so forth. It will be understood that the buffers 140 and 142 may be separate or combined into a convenient format, and may occupy memory as described herein.

Once a match is found with a reference block, the intra-prediction unit 124 provides the image data of the one or more matching reference blocks to the prediction mode selector 126. By one form, previously reconstructed image data of the reference block is provided as the prediction, but alternatively, the original pixel image data of the reference block could be provided as the prediction instead. Either choice may be used regardless of the type of image data that was used to match the blocks.

When the IBC intra-prediction is selected as the best or winner mode for a prediction block, the predicted block then may be subtracted at subtractor 106 from the current block of original image data, and the resulting residual may be partitioned into one or more transform blocks (TUs) so that the transform/quantizer unit 108 can transform the divided residual data into transform coefficients using discrete cosine transform (DCT) for example. Using the quantization parameter (QP) set by the controller 109, the quantizer 108 then uses lossy resampling or quantization on the coefficients. The frames and residuals along with supporting or context data such as IBC intra block size and intra displacement vectors and so forth may be entropy encoded by entropy coder unit 110 and transmitted to decoders.

In some examples, video coding system 100 may include additional items that have not been shown in FIG. 1 for the sake of clarity. For example, video coding system 100 may include a processor, a radio frequency-type (RF) transceiver, splitter and/or multiplexor, a display, and/or an antenna. Further, video coding system 100 may include additional items such as a speaker, a microphone, an accelerometer, memory, a router, network interface logic, and so forth. Some of these components are shown on other implementations described herein.

Referring to FIG. 2, a system 200 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks as well as intra displacement vectors for the IBC search reference blocks by one example. The context also may include prediction modes for individual blocks, other partitions such as slices, inter-prediction motion vectors, partitions, quantization parameters, filter information, and so forth. The system 200 may process the bitstream with an entropy decoding module 202 to extract the quantized residual coefficients as well as the context data. The system 200 then may use an inverse quantizer module 204 and inverse transform module 206 to reconstruct the residual pixel data.

The system 200 then may use an adder 208 (along with assemblers not shown) to add the residual to a predicted block. The system 200 also may decode the resulting data using a decoding technique employed depending on the coding mode indicated in syntax of the bitstream, and either a first path including an intra predictor module 216 of a prediction unit 212 or a second path that is an inter-prediction decoding path including one or more in-loop filters 210. The intra predictor module 216 performs intra-prediction including the IBC by using reference block sizes and the intra displacement or motion vectors extracted from the bitstream, and previously established at the encoder. By one approach, data of the IBC search space definition is not received or generated at the decoder since there is no need for them. By other alternatives, it will be appreciate that either the block index defining an IBC search space could be transmitted to the decoder as well, or the decoder can perform its own block indexing to define the IBC search space, when the decoder is to perform its own IBC search. A motion compensated predictor 214 utilizes reconstructed frames as well as inter-prediction motion vectors from the bitstream to reconstruct a predicted block.

The prediction modes selector 218 sets the correct prediction mode for each block as mentioned, where the prediction mode may be extracted and decompressed from the compressed bitstream. A block assembler (not shown) may be provided at the output of the selector 218 before the blocks are provided to the adder 208 when needed.

The functionality of modules described herein for systems 100 and 200, except for the units related to the IBC search for example and described in detail herein, are well recognized in the art and will not be described in any greater detail herein.

Figure 3:
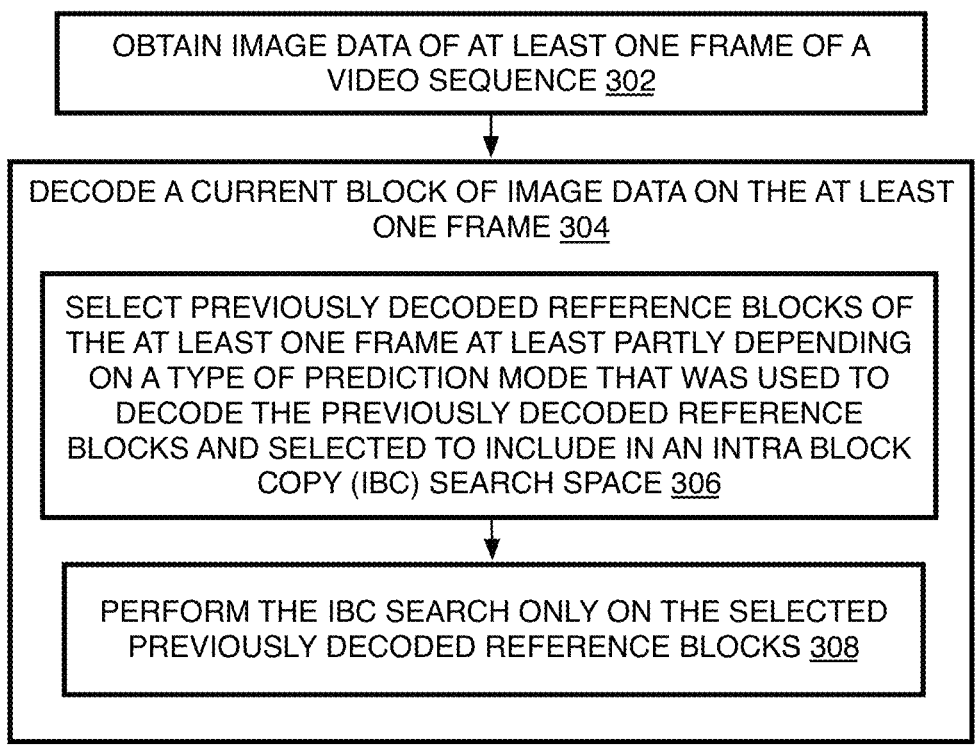
FIG. 3 is a flow chart of a method of video coding with efficient intra block copying according to at least one of the implementations herein.

Referring now to FIG. 3, an example process 300 is arranged in accordance with at least some implementations of the present disclosure. In general, process 300 may provide a computer-implemented method of video coding with efficient intra block copying according to at least one of the implementations herein. In the illustrated implementation, process 300 may include one or more operations, functions or actions as illustrated by one or more of operations 302 to 308 numbered evenly. By way of non-limiting example, process 300 may be described herein with reference to operations discussed with respect to FIG. 1, 2, or 8 herein and may be discussed with regard to example systems 100, 200, or 800.

Process 300 may include "obtain image data of at least one frame of a video sequence" 302. The image data of the frames may be synthetic or screen content, natural camera-captured content, or a combination of both. By one form, this operation may refer to an encoder receiving non-compressed image data to be encoded, compressing that image data, and then obtaining reconstructed image data on a decoder (or decoding) loop of an encoder, and of previously decoded blocks on the same frame as a current block being decoded to use as reference frames. Also, the images may be pre-processed sufficiently for encoding.

Process 300 may include "decode a current block of image data on the at least one frame" 304, and as described herein, where the frame, or part of the frame, is being reconstructed in intra-prediction where blocks of image data on a same frame as the current frame are copied to the current block position or are used to generate image data for the current block position.

The decoding operation 304 may include "select previously decoded reference blocks of the at least one frame at least partly depending on a type of prediction mode that was used to decode the previously decoded reference blocks and selected to include in an intra block copy (IBC) search space" 306. Thus, for an IBC search, when a previously decoded reference frame on the same frame as the current block is found to have image data that sufficiently matches original image data of the current block, the image data of the reference block is selected as the prediction image data of the current block. By one form, the types of prediction modes included are the n-most used prediction modes that were found to decode substantially synthetic images during coding and available in a video coding standard being used to decode the at least one frame. This refers to the selected prediction modes being determined generally by experimentation with many videos or otherwise are those prediction modes known to be most selected for synthetic images in video coding by the video coding industry or from video coding publications. By one approach, the types of prediction mode for inclusion include the IBC prediction mode itself and a palette prediction mode. By one form, the content of the image data of the previously decoded reference blocks do not matter, and the positions of the previously decoded reference blocks in the frame does not matter, except excluding two super block spaces just left of the current block, and as long as the positions maintain the desired wave form (or wave front) order, which could be a raster order instead.

By one approach, growing the IBC search space is accomplished by adding a sub-division block to the IBC search space that is the largest available sub-division of a super-block and added when the sub-division block is the current block or the current block is within the sub-division block and was decoded by using one or more of the prediction modes indicating inclusion of the current block into the IBC search space. Thus for example, when the super-block is 128×128, and the largest sub-block or sub-division is 64×64, when any sub-division of the 64×64 block is found to have one of the included prediction modes (such as 16×16 for example, then the 64×64 block is added to the IBC search space, not just the 16×16 block. It should be noted in other examples the super-block may be the 64×64 pixel block, and the 32×32 blocks are added to the IBC search space.

By one example, the blocks included in the search space are tracked by maintaining an IBC search space buffer. In this case, the previously decoded blocks are listed in a buffer, and when a previously decoded block has an included type of prediction mode, an IBC search indicator may list the block as being included in IBC search spaces for any following current blocks of the frame. By one form, all blocks of a frame are listed as the blocks are being decoded in order of the decoding, such as in raster order to indicate a frame position of the block, and a single binary bit indicator may indicate whether the block is included in the IBC search space or not. Other forms of the buffer could be used as well. While largely meant for the encoder, it will be appreciated that these operations of process 300 could be performed at a decoder if desired.

The decoding operation 304 then may include "perform IBC search only on the selected previously decoded reference blocks" 308, where the search is performed. By one approach, a search is performed to find a block with a size that is the same as the current block size. The current block may be any available size of the video coding standard being used, and for AV1, from 128×128 to 4×4 or any sub-block size therebetween. By one option mentioned herein, a maximum of 32×32 blocks may be used in the search to increase performance since winner IBC searches on larger blocks are usually rare. Either the partition unit of the encoder or a block partitioner of the IBC unit itself may perform such partitioning of larger blocks for IBC when desired, but otherwise IBC prediction mode will simply be unavailable for larger blocks while other prediction modes still can be used with larger blocks. When multiple alternative candidate block sizes are used at and within a super block, the larger blocks are simply skipped for the IBC prediction mode for example.

Referring to FIG. 4, an example process 400 is arranged in accordance with at least some implementations of the present disclosure. In general, process 400 may provide a computer-implemented method of video coding with efficient intra block copying. In the illustrated implementation, process 400 may include one or more operations, functions or actions as illustrated by one or more of operations 402 to 430 generally numbered evenly. By way of non-limiting example, process 400 may be described herein with reference to operations discussed with respect to FIG. 1, 2 or 8 and with regard to example systems 100, 200, or 800 discussed herein.

The process 400 may include "obtain image data of a frame of a video sequence" 402, and this is as described above with system 100 and process 300, where encoded image data blocks are to be reconstructed on a decoder loop of an encoder for example. Also, this operation may include any pre-processing of the original non-compressed image data needed for encoding. By other examples, this operation, and the following operations, could be performed on a decoder unless stated otherwise.

Process 400 may include "decode previous blocks of a frame" 404. Here, previous refers to a block decoding order such as wave form or raster order for example, and relative to a current block to be decoded, which by one form, is at the right most position of the row so far being decoded in wave form or raster order. This operation generates potential reference blocks for the current block, and the decoding proceeds as with known video coding standards, such as AV1 by one example. By one form then, the decoding proceeds super-block by super-block, where a single super-block may be sub-divided so that a single super-block can have multiple alternative candidate predictions of various block sizes. The previously decoded blocks that are potentially reference blocks may be decoded by many different intra-prediction modes as mentioned, such as DC, angle or directional or angle modes, IBC, palette, and so forth. A single block may have multiple candidate predictions some of which may be from various prediction modes, while others may be form the same prediction mode but with various block sizes within a single super-block. As mentioned above, a prediction selector will select which candidate prediction mode is the best or winner prediction mode for a particular block.

Process 400 may include "generate IBC search space" 406, where the system decides which previously decoded blocks to include in the IBC search space to perform IBC for a current block. This may include "obtain prediction mode of decoded block" 408, where the winner or selected prediction mode is obtained for each of the previously decoded blocks, and by one form, the selected prediction mode is obtained just after the block was decoded, block-by-block.

Process 400 may include "determine if decoded block is to be included in the IBC search space depending on the type of prediction mode of the decoded block" 410. Specifically, the disclosed IBC search method restricts the IBC search to a reduced total area in the frame (or tile or slice on the frame) relative to the unrestricted search, thereby allowing the search to be "smart" and significantly reducing the search area to achieve a large increase in efficiency. This involves identifying specific regions of a frame where IBC matches are most likely to result in an IBC prediction mode winner for a current block. This was determined by analyzing both the video content characteristics in an I-frame and the coding tools used for an I-frame. The analysis revealed that flat regions, regions with gradually changing intensity, and regions with directional correlation are usually coded as direct current (DC) intra coding which combines data of just the block to the left and above the current block being reconstructed to form the image data prediction of a current block. On the other hand, text (such as with word processors or mainly textual web sites), patterns, and graphic areas, which includes natural or camera captured images, most commonly end up being coded as palette or IBC. Generally, a palette prediction mode determines which different colors of pixel image data exist in a block, and assigns each color a different color index code so that instead of coding each pixel image data value in a block, a palette index table as well as the index values of the pixels in the block are encoded and decoded instead. If a pattern or text occurs for the first time in an I-frame or intra area of a frame, it is usually coded with a palette prediction mode. Otherwise, the majority of text and patterns are usually coded as IBC. If there is a prior occurrence of a graphic area in the coded regions of the frame, IBC is often used as the preferred intra coding selection or winner. With this in mind, a simple method to identify and track potential IBC search regions is as follows.

First, at the end of coding every superblock set as 128×128 (or other super-block size such as 64×64), the following criteria operations may be performed to set the reduced IBC search space.

If any sub-block (sized 4×4 pixels through the largest sub-block size which may be 64×64 when the super-block is 128×128 pixels) is coded as a palette winner, then the corresponding largest sub-block is marked as part of the IBC search space for current blocks to be decoded (or reconstructed or predicted) going forward. In other words, no matter the size of the palette sub-block, the largest available sub-block is added to the IBC search space that is or has the palette sub-block within it.

Similarly, if any sub-block (again, sized 4×4 through the largest sub-block size less than the super-block, such as 64×64) is coded as an IBC winner, then the corresponding largest available sub-block that is or has an IBC sub-block within it is marked as part of the IBC search space for current blocks in the remaining part of the frame not yet decoded. It will be understood that usually the super-block is considered the largest available block that is sub-divided and that can be coded as a single division unit for at least one or more intra-prediction modes, such that predictions can be formed for a single entire super block without sub-divisions. It should be noted that the except is when a slice or tile can be as small as the super-block.

Figure 5:
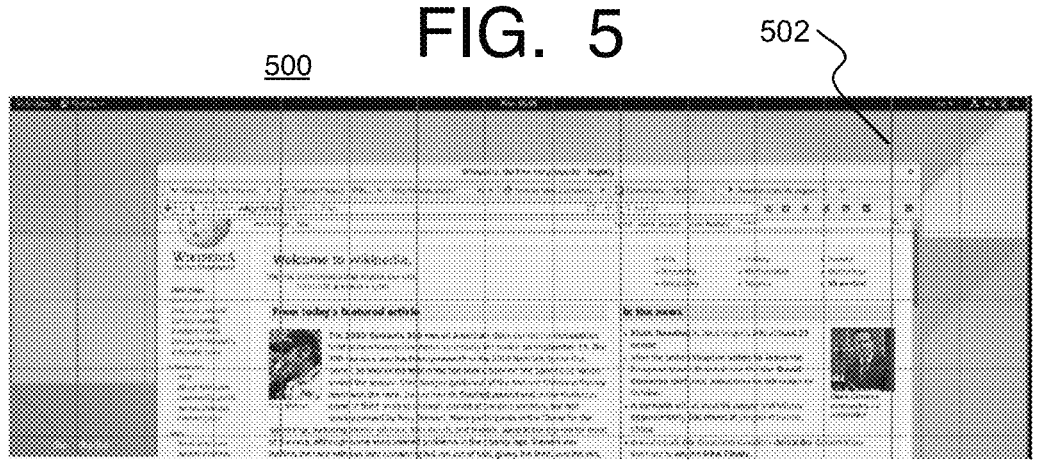
FIG. 5 is a screenshot of an annotated video frame to be encoded.
Figure 6:
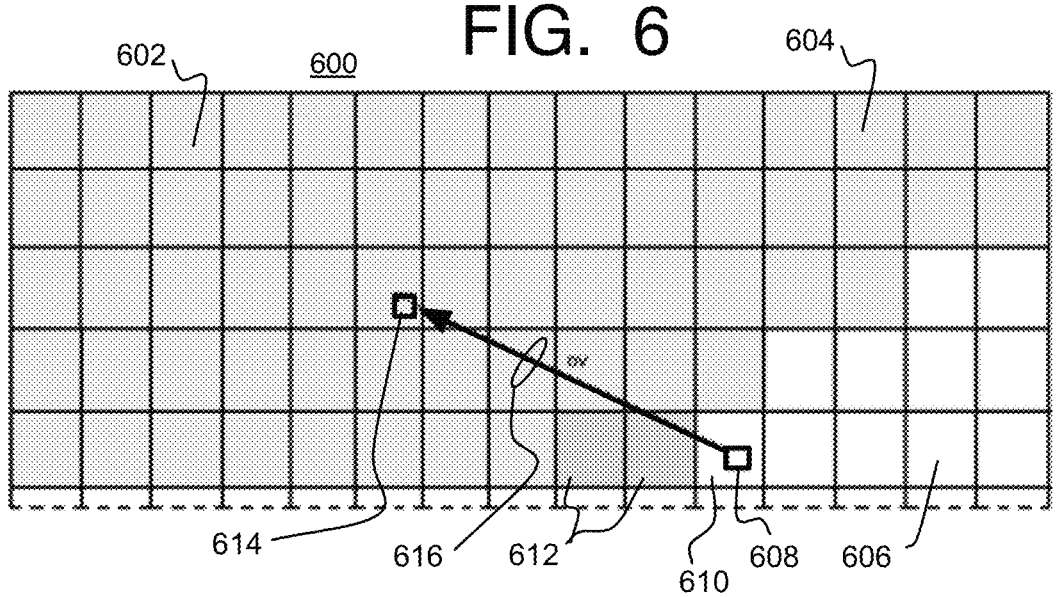
FIG. 6 is a schematic diagram of the video frame of FIG. 5 divided into blocks to show a conventional intra block copying search.
Figure 7:
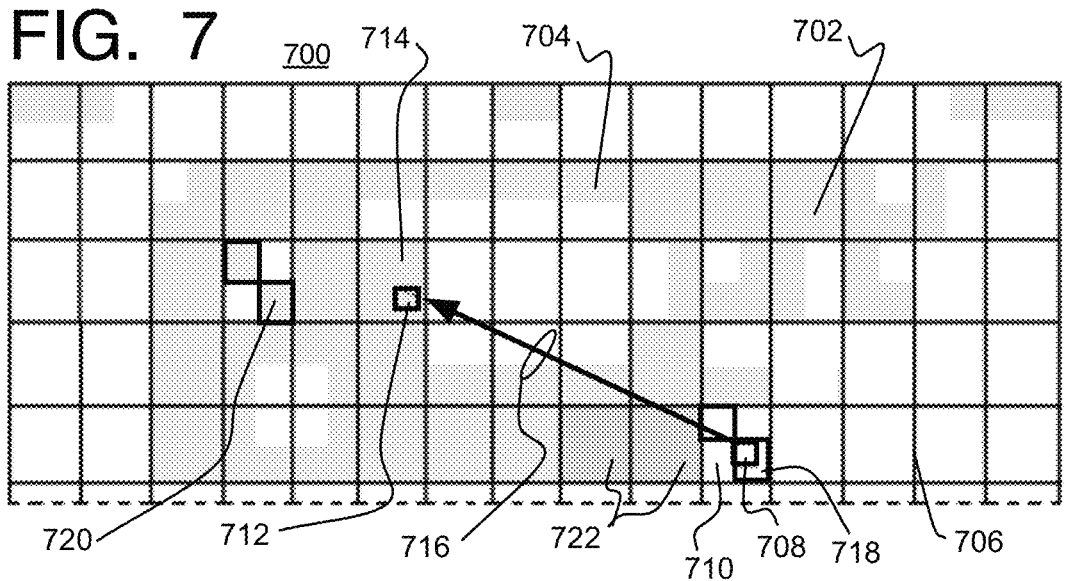
FIG. 7 is a schematic diagram of the video frame of FIG. 5 divided into blocks to show an intra block copying search according to at least one of the implementations herein.

Referring to FIGS. 5-7, the reduction in IBC search space is explained graphically. An image 500 is a typical website text screen shot, with a grid of overlaying the image. Each square of the grid forms rows and columns of large pixel blocks in the image 500, which may be super-blocks (SB) 502 of 128×128 pixels by one example. A corresponding image 600 shows a conventional unrestricted IBC search space 602 where shaded SBs 604 are form the search space 602, and unshaded SBs 606 are not in the search space. A current block 608 to be decoded in within an SB 610 currently being predicted. The shaded SBs 604 in the IBC search space 602 are all available except the two SBs 612 to the left of the SB 610 with the current block 608. The two-block exception is used because these SBs usually do not yet have image data available for use as reference blocks due to processing time limitations of hardware, graphics accelerators, and so forth. The number of block exceptions could be conditional on standards and/or specific implementations, such as 0, 1, 2, or more blocks. A reference block 614 is the final best match IBC winner that corresponds to the current block 608, and a displacement vector (DV) 616 becomes part of the prediction data to indicate the position of the reference block 614 relative to the current bock 608. More candidates may be generated for the same or other blocks within SB 610, and then SBs 606 still need to be predicted in a wave front or other order.

With the IBC search space 602, such as with the AV1 video coding standard, no restriction exists on the IBC search range so that almost all previously decoded SBs in the frame are available for the IBC search for the current block. This results in the lowering of efficiency of the intra-prediction process from a very large computational load and delay to search all of the included SBs 604. The resulting large IBC search space becomes too large because the complexity of the IBC search becomes greater as more and more SBs are added to the IBC search space, increasing the IBC search space at a relatively fast rate. Also, for natural, camera captured content, the extensive and highly complex IBC search results in relatively little or no added value or increased quality since IBC is really a coding tool for achieving gains with synthetic images.

Referring to FIG. 7, an image 700 shows a reduced IBC search space 702 according to the implementations herein and with shaded blocks or areas 704 that form the IBC search space 702. Unshaded spaces 706 are ignored by the IBC search. The search is now restricted only to the highlighted regions rather than the entire coded region of the frame thereby reducing the number of active search points. This image is shown with a current block 708 in an SB 710 that is matched to a reference block 712 in an SB 714, and indicated by a displacement vector (DV) 716 as described above. Also as mentioned above, blocks 722 to the left of the current SB 710 will be excluded for the search for the current block 708.

Hereafter, since SB 710 has an IBC block within it, being current block 708, a 64×64 sub-division 718 within SB 710 will be considered part of the IBC search space 702. The whole SB 710 will be considered entirely within the IBC search space 702 only if all four 64×64 quadrants of the 128×128 SB 710 are each found to have an IBC or palette prediction mode block. Sub-blocks 720 also are part of the IBC search space 702 and demonstrate that the largest sub-blocks 720, as well as largest sub-block 718, are added to grow the IBC search space rather than just the smaller current block 708 for example.

A variety of sizes were considered before narrowing down the sub-division to add to the IBC search space on a 64×64 granularity for tracking the search region. Each of 128×128, 64×64 and 32×32 sub-divisions were considered for addition to the IBC search space. It was found that the smaller the granularity, the more fine-tuned and restricted the search can be. After experimentations, however, the current configuration to add 64×64 sub-divisions to the IBC search space was used because AV1 supports an SB size of 64×64, hence aligning with AV1 definitions which eases implementation and integration of the reduced IBC search into current AV1 CODEC, and the increase of included block size from 32×32 to 64×64 is relatively minimal so that it adds little complexity, and may reduce complexity, to the encoder implementation.

Process 400 may include "list decoded blocks in an IBC search space buffer" 412, and as mentioned, this may include having the encoder (or decoder) maintain a buffer for internal tracking which dynamically gets updated at the end of every superblock. By one form, this operation may include "indicate whether or not the decoded block is to be included in the IBC search space" 414. Thus, the buffer lists the largest sub-blocks of a super-block in a specific order so that addresses do not need to be stored, such as in raster order from super-block to super block, and then in raster order of four largest sub-blocks within each super-block for example. Many variations can be used. This may be performed simply by the position of the memory field for a bit indicating whether or not the block is to be included in the IBC search space (such as a binary 0 or 1). Thus, a buffer surface with the fields is programmed to have a 1-bit field for every 64×64 block indicating if the region is a potential search region for IBC.

Process 400 may include "perform IBC prediction mode search for current block" 416, where now a search is performed for a current block to generate a prediction to decode the current block. For this operation, process 400 may include "obtain current block position, size, and shape" 418, where the position of the current block is determined, such as at an anchor pixel which may be the upper left corner of the current block. The size of the current block may be obtained from the partition unit of the encoder (or decoder) for example, and may be the SB block size (128×128 or 64×64) depending on the codec settings, or any sub-division thereof as mentioned above with encoder 100. The size may reveal the shape of the block such as 16×32 versus 32×16, when the first dimension is always horizontal for example.

Optionally, process 400 may include "limit maximum IBC current block size to maximum efficiency size" 420. To further reduce complexity and potentially improve encoder run-times for greater performance, an option may be used to restrict the maximum current block size, and in turn the reference block size, for IBC prediction mode search and matching. By one form, the maximum current block and reference (or prediction) size was set to 32×32 pixels. To determine which size to use, the system was tested and statistics were analyzed by providing IBC shape buckets or bins for 128, 64, 32, 16, 8, and 4 pixel blocks, each with their related variant shapes included to extract statistics to identify the most commonly winning IBC shapes. The experiment was conducted on a small sample set of three clips (referred to as Console 1080p, Flying Graphics 1080p, and Map 720p) from HEVC SCC CTC, in both 420 and 444 color scheme formats, each encoded in all-intra (all frames are I-frames) configurations for five frames with four different QPs (22, 27, 32, 37). The three clips also were chosen to show the benefit for IBC as a coding tool across all SCC clips tested (HEVC & AV1).

Shown below is a Table 1 with each line being a 20-frame average of All-Intra (AI) execution (with four QPs with five frames each) to extract data trends on IBC winners across block sizes.

TABLE 1

| | | | IBC winners | | | |
|---|---|---|---|---|---|---|
| | | 64 × 64 | 32 × 32 | 16 × 16 | | |
| | | 64 × 32 | 32 × 16 | 16 × 8 | | |
| | 128 × 128 | 32 × 64 | 16 × 32 | 8 × 16 | 8 × 8 | |
| Content, res. | 128 × 64 | 64 × 16 | 32 × 8 | 16 × 4 | 8 × 4 | |
| color scheme | 64 × 128 | 16 × 64 | 8 × 32 | 4 × 16 | 4 × 8 | 4 × 4 |
| Map, 720p, 420 | 0.00 | 0.02 | 1.08 | 20.53 | 61.16 | 17.21 |
| Map, 720p, 444 | 0.00 | 0.07 | 0,47 | 12.34 | 58.08 | 29.04 |
| Console, 1080p, 420 | 0.00 | 0.71 | 8.53 | 31.40 | 44.51 | 14.76 |
| Console, 1080p, 444 | 0.00 | 0.41 | 6.15 | 24.58 | 38.08 | 30.57 |
| FlyingGraphics, 1080p, 420 | 0.06 | 0.43 | 3.94 | 27.92 | 48.50 | 19.14 |
| FlyingGraphics, 1080p.444 | 0.04 | 0.34 | 2.34 | 19.00 | 42.06 | 36.22 |
| Desktop, 1080p, 420 | 0.00 | 0.10 | 4.44 | 32.88 | 47.87 | 14.72 |
| Desktop, 1080p, 444 | 0.00 | 0.07 | 2.51 | 22.11 | 39.97 | 35.34 |
| Total Ave. | 0.01 | 0.27 | 3.70 | 23.86 | 47.53 | 24.64 |

From the Table 1, IBC shapes larger than 32×32 pixels contribute to less than 0.3% of all IBC winners across the different contents and formats tested. Thus, by this option, the maximum current block size, and in turn prediction and reference block size, may be set to 32×32 pixels. Also, restricting the IBC block size to 32×32 pixels can potentially improve latency in hardware implementations since time is not wasted on finding large current and reference blocks that match. As shown on the Table 1 above, maximum refers to the height and width dimensions so that no side can be longer than 32 pixels for example, but the maximum could refer to the total pixel area instead when desired.

Accordingly, the block size limit operation 420 may include "partition large blocks to maximum size" 422. Thus, when a current block is greater than 32×32, the encoder may have either the encoder partition unit, or an IBC partition unit of the IBC unit, perform further partitioning of the large current block until it is 32×32 or has smaller divisions. Each new sub-division will then be listed by upper-left corner pixel address and size, and added to the list of current blocks to be decoded, and specifically to the list of blocks to be decoded within the super-block in which it resides.

Process 400 may include "obtain IBC search space" 424, where either all of the addresses of the search space may be acquired and placed in memory for use and all at once, or more likely, this may refer to the IBC unit looking up the address of the reference block as the search proceeds and as the blocks on an image are reached for the search, such as in raster or wave form order. Specifically, By one form, the search may be performed in full-pel resolution depending on the video coding standard used. For example, sub-pixel displacements are not allowed in the IBC tool in AV1. Otherwise as mentioned, in order to perform the search itself as the frame gets coded, every or individual previously decoded block search start point is validated relative to the location of a current coded block. Then, the IBC unit determines whether the starting coordinates of the previously decoded block, such as the upper left corner pixel coordinates of the block (the start or anchor pixel), falls within the IBC search space by looking up the block that includes the start pixel on the IBC search space buffer. When the start point falls within a valid search space region as previously marked as a decoded block within the search space in the internal buffer, then the DV of various block sizes within a super-block is searched for a potential IBC winner. If not indicated as part of the IBC search space in the buffer, then that start pixel is skipped, and the system moves on to the next start pixel. All start pixels within the same super-block may be checked sub-block by sub-block to maximize the opportunity to find a better IBC winner.

Process 400 may include "exclude immediate left block(s)" 426. As mentioned above, this simply refers to a 256 pixel wide area just before (to the left) of the current block being predicted being excluded from the IBC search space since these superblocks most likely are not fully decoded yet, when proceeding in wave form or raster order, and in time for use in the IBC search. The number of exclusion blocks could be varied with different standards or implementations.

Process 400 may include "search IBC search space for matching blocks" 428. Here, for the IBC search, the AV1 specifies that the predictor or reference block may not overlap the current coding block and should be within the same slice and tile as the current coding unit (CU). The search window for IBC is maintained to be previously encoded blocks generally covering those blocks above and to the left of the current block to avoid affecting parallel processing capability provided by wave fronts.

Also, by one form, the search may be a combination of a classic diamond search, searching for matching image data between original data of the current block and the reference block data, such as by SAD, and then followed by a hash search (since CRC is used as a hash metric). The searches may be performed with Y luminance data, but other alternatives could be used. A hash-based search provides each block of an image with a hash because a hash can change depending on small changes of pixel image data in a block. The hash, or more particularly a hash code or value, is a generic way to convert a series of data into a fixed size value. A number of different ways exist to compute a hash code such as by using a cyclic redundancy check (CRC) calculator or using a XOR operation on individual double words (DWORDs) of an input data series to name a few examples. More complicated algorithms, such as MD5, also can be used.

Since a block of pixels can be used to create a hash code that is unique to that sequence of pixels in the block, the hash algorithm guarantees that different input data will generate different hash codes so that comparing two hash codes generated from two data series, such as two different blocks on a frame, indicates whether or not the two data series are exactly the same or not. Thus, once the hashes are generated, a reference hash of a previously encoded reference block on the frame is compared to a current source block hash of original image data of a current block being reconstructed on the same frame to determine if the two blocks are an exact match. If the hashes are the same, then the image data of the reference block is used as the reconstructed data of the current source block.

Process 400 then may include "provide image data of matching block(s) as candidate predictions for intra-prediction" 430, where the prediction unit determines if the IBC prediction(s) are to be selected, based on least bit cost or other factors, and if selected, the encoder provides the prediction to be subtracted from the original image data to form a residual to be compressed, and to an adder on the decoding loop of the encoder to reconstruct the block to use it as a reference block.

By one form, the reduced IBC search space method and system herein changes the encoder, but does not change the operation and specification of the decoder In this case, as mentioned above, the decoder may receive the block data and prediction mode selection so that no IBC search is performed at the decoder. In other alternatives, the decoder may receive the IBC search space data from the IBC search buffer, or may perform operations to duplicate the IBC search space, so that the decoder can perform its own search with operations mentioned herein to reduce the size of the IBC search space.

Experiments: Common Test Condition (CTC) Results

AV1 CTC was used to test the disclosed method. The AV1 CTC has a total of 30 clips, spanning multiple resolutions (360p, 720p and 1080p) of 60 frames each, covering varied content types, all in 420 format. Categories of the selected content are broadly classified as follows: 'Natural video (NV)' and 'Screen Content (SC)' (which has both Text and Graphics with motion (TGM) and Animation (A)). The standard four QP configuration was used and that are common to CODEC testing: QPs [22, 27, 32, 37]. By one form, since the IBC search is only on Y-channel data, it is sufficient to test the quality impact and resulting encoder speed increases for 420 content. Also, AV1 allows IBC on intra-frames alone, hence, all tests were run with an "All-Intra" (AI) configuration where each frame in the clip is coded as an intra frame.

The base command line parameters used to run CTC tests was: "--codec=av1-v--psnr--ivf--disable-warning-prompt--test-decode=fatal--frame-parallel=0--tile-columns=0--cpu-used=0--threads=1--kf-min-dist=1--kf-max-dist=1--tune-content=screen--end-usage=q--cq-level=qp--min-q=qp--max-q=qp"

Shown below are tabulated results for AV1 CTC for Objective-1-fast clips, where the latest AV1 code was used with IBC turned on. The first five rows show the Screen Content (SC) clips, and the remaining content fall under the Natural video (NV) category. Two sets of results are shared: (1) The disclosed reduced IBC search, and (2) the disclosed reduced IBC search with IBC block size restrictions, as follows.

TABLE 2

| YUV 420 Encoding (Reduced IBC Search): | | | | |
|---|---|---|---|---|
| | BD-Rate (Piecewise Cubic) | | | |
| Clip Name | PSNR-Y | PSNR-U | PSNR-V | PSNR-YUV |
| Dota2 | 0.04% | 0.01% | 0.02% | 0.03% |
| Life | 0.10% | 0.16% | 0.21% | 0.12% |
| MineCraft | 0.05% | −0.03% | −0.04% | 0.03% |
| StarCraft | 0.05% | 0.12% | 0.12% | 0.07% |
| Wikipedia | 0.02% | 0.13% | 0.09% | 0.04% |
| NetflixAerial | 0.03% | 0.04% | −0.02% | 0.03% |
| NetflixBoat | −0.43% | −0.52% | −0.76% | −0.48% |
| NetflixCrossWalk | −1.33% | −1.43% | −1.67% | −1.39% |
| NetflixFoodMarket | −0.14% | −0.25% | −0.40% | −0.19% |
| NetflixPierSeaside | −0.26% | −0.33% | −0.15% | −0.25% |
| NetflixSquareandTimelapse | −0.72% | −1.04% | −0.79% | −0.77% |
| NetflixTunnelFlag | 0.79% | 1.06% | 1.03% | 0.85% |
| NetflixDrivingPOV | −0.26% | −0.49% | −0.33% | −0.29% |
| NetflixRollerCoaster | −2.55% | −2.64% | −1.84% | −2.47% |
| DucksTakeOff | −0.79% | −1.01% | −1.35% | −0.89% |
| Aspen | −0.11% | −0.28% | −0.13% | −0.13% |
| RushHour | −1.57% | −0.98% | −1.08% | −1.44% |
| TouchdownPass | 0.02% | −0.01% | −0.01% | 0.01% |
| KristenAndSara | −3.45% | −4.42% | −6.46% | −3.95% |
| Vidyo1 | −0.33% | −0.43% | −0.43% | −0.36% |
| Vidyo4 | −0.74% | −1.38% | −1.55% | −0.92% |
| GipRestat | 0.09% | 0.14% | 0.22% | 0.11% |
| Dark | −0.60% | −0.10% | −0.33% | −0.50% |
| BlueSky | 0.00% | 0.02% | 0.03% | 0.01% |

TABLE 2-continued

YUV 420 Encoding (Reduced IBC Search):

BD-Rate (Piecewise Cubic)

| Clip Name | PSNR-Y | PSNR-U | PSNR-V | PSNR-YUV |
|---|---|---|---|---|
| Kirkland | −1.71% | −1.70% | −2.77% | −1.84% |
| Niklas | −0.63% | −1.06% | −1.21% | −0.76% |
| RedKayak | −0.33% | −1.42% | −1.53% | −0.61% |
| Shields | −0.49% | −1.36% | −1.78% | −0.76% |
| SpeedBag | −1.27% | −1.04% | −1.39% | −1.26% |
| ThalounDeskMtg | −0.67% | −1.70% | −2.21% | −0.99% |

TABLE 3

YUV 420 Encoding (Reduced IBC Search w/IBC Block size restriction).

BD-Rate (Piecewise Cubic)

| Clip Name | PSNR-Y | PSNR-U | PSNR-V | PSNR-YUV |
|---|---|---|---|---|
| Dota2 | 0.04% | 0.01% | 0.02% | 0.03% |
| Life | 0.10% | 0.16% | 0.21% | 0.12% |
| MineCraft | 0.06% | −0.07% | −0.06% | 0.03% |
| StarCraft | 0.11% | 0.25% | 0.19% | 0.13% |
| Wikipedia | 0.10% | 0.18% | 0.27% | 0.13% |
| NetflixAerial | 0.02% | −0.01% | −0.12% | 0.00% |
| NetflixBoat | −0.43% | −0.52% | −0.76% | −0.48% |
| NetflixCrossWalk | −3.01% | −3.08% | −3.79% | −3.12% |
| NetflixFoodMarket | −0.18% | −0.28% | −0.45% | −0.23% |
| NetflixPierSeaside | −0.36% | −0.39% | −0.23% | −0.35% |
| NetflixSquareandTimelapse | −0.72% | −1.04% | −0.79% | −0.77% |
| NetflixTunnelFlag | 0.79% | 1.08% | 1.03% | 0.85% |
| NetflixDrivingPOV | −0.26% | −0.49% | −0.33% | −0.29% |
| NetflixRollerCoaster | −2.55% | −2.64% | −1.84% | −2.47% |

TABLE 3-continued

YUV 420 Encoding (Reduced IBC Search w/IBC Block size restriction).

BD-Rate (Piecewise Cubic)

| Clip Name | PSNR-Y | PSNR-U | PSNR-V | PSNR-YUV |
|---|---|---|---|---|
| DucksTakeOff | −0.79% | −1.01% | −1.35% | −0.89% |
| Aspen | −1.43% | −4.05% | −2.05% | −1.83% |
| RushHour | −2.56% | −1.52% | −1.72% | −2.33% |
| TouchdownPass | 0.02% | −0.05% | −0.01% | 0.01% |
| KristenAndSara | −3.66% | −4.69% | −6.87% | −4.19% |
| Vidyo1 | −0.33% | −0.38% | −0.40% | −0.34% |
| Vidyo4 | −0.81% | −1.53% | −1.69% | −1.01% |
| GipRestat | 0.09% | 0.12% | 0.18% | 0.11% |
| Dark | −0.63% | −0.11% | −0.34% | −0.53% |
| BlueSky | 0.00% | 0.02% | 0.03% | 0.01% |
| Kirkland | −1.71% | −1.68% | −2.75% | −1.84% |
| Niklas | −0.63% | −1.06% | −1.21% | −0.76% |
| RedKayak | −0.33% | −1.42% | −1.53% | −0.61% |
| Shields | −0.49% | −1.36% | −1.77% | −0.76% |
| SpeedBag | −1.27% | −1.04% | −1.40% | −1.26% |
| ThalounDeskMtg | −0.71% | −1.74% | −2.33% | −1.04% |

Summary of CTC Results

Based on the CTC results from Tables 2-3, though the disclosed reduced IBC search method and the IBC block size restriction were mainly targeted at encoder complexity reduction and speed increases, additionally, results show a minor quality improvement. Shown below is a summarized Table 4 of the AV1 CTC results. Analyzing the results across the different content categories (Natural Video & Screen Content), the disclosed method shows an average of about 0.8% BD-Rate improvement in YUV for natural video, with some clips showing a BD-rate improvement as high as about 4.0% improvements.

TABLE 4

All Intra (AV1_Optimized_IBCSearch vs. Baseline)

| | Content Type | PSNR-Y | PSNR-U | PSNR-V | PSNR-YUV |
|---|---|---|---|---|---|
| QP 22, 27, 32, 37 | Natural Video | −0.70% | −0.89% | −1.08% | −0.77% |
| | Screen Content | 0.05% | 0.08% | 0.08% | 0.06% |
| | Average | −0.57% | −0.73% | −0.88% | −0.63% |
| | Minimum | −3.45% | −4.42% | −6.46% | −3.95% |

When combining the reduced IBC search with the maximum block size restriction for IBC, the test reveals a further increase in quality for natural video content as shown on Table 5 below. The average BD-Rate improvement in YUV experienced is about 1.0% with some clips showing as high as about 4.2% overall. A 1% improvement is considered an excellent improvement in the carefully controlled compression systems.

TABLE 5

All Intra (AV1_Optimized_IBCSearch_BlockSize_restrict on vs. Baseline)

| | Content Type | PSNR-Y | PSNR-U | PSNR-V | PSNR-YUV |
|---|---|---|---|---|---|
| QP 22, 27, 32, 37 | Natural Video | −0.88% | −1.15% | −1.30% | −0.96% |
| | Scr. Content | 0.08% | 0.11% | 0.13% | 0.09% |
| | Average | −0.72% | −0.94% | −1.06% | −0.79% |
| | Minimum | −3.66% | −4.69% | −6.87% | −4.19% |

Also, IBC is a coding tool introduced to take advantage of repeated patterns in computer generated content. It is rare for a pure natural video clip to have IBC winners. In other words, the IBC winners in natural video are likely a byproduct of a possible inaccuracy with cost tuning for IBC. Since cost tuning can never be accurate for all content types, by enabling the reduced IBC search method, the unnecessary IBC winners can be restricted, thereby seeing a BD-Rate improvement for natural video content. It is worthy to note that with both the above disclosed techniques, negligible loss of quality on screen content clips indicate that the reduced IBC search is able to adaptively address different content types and does not compromise accuracy of IBC winners.

For encoder run-time experiments, a handful of clips were selected from the AV1 CTC to run a local analysis and estimate encoder speed increases with the disclosed method and system. The experiment was conducted on a sample set of eight clips (four screen content clips and four natural video clips) from the AV1 CTC in 420 color scheme format. The latest AV1 code was used with IBC turned on. Each clip was encoded in all-intra (AI) configuration (with the command line specified in the CTC section) for five frames across five different QPs (22, 27, 32, 37, 42).

Presented in the Table 6 below is the encoder run-time statistics comparisons among the latest AV1 standard with unrestricted IBC search, the disclosed reduced IBC search alone, and the disclosed reduced IBC search with the enforced block-size restrictions. Each row in the table is a per-frame encode time for the corresponding clip averaged over 25-frames (5 frames per QP*5 QPs).

TABLE 6

| Content Name, Resolution | Latest AV1 IBC Search Encode Time (mins) | IBC Search with Reduced Area Alone Encode Time (mins/percent) | IBC Search with Reduced Area and Limited Block Size Encode Time (mins/percent) |
|---|---|---|---|
| Wikipedia, 1080p, 420 | 3.08 | 2.76/90 | 1.96/64 |
| Dota2, 1080p, 420 | 2.40 | 2.12/88 | 2.12/88 |
| StarCraft, 1080p, 420 | 2.08 | 1.87/90 | 1.77/85 |
| MineCraft, 1080p, 420 | 2.38 | 2.36/99 | 2.04/86 |
| Netflix Aerial, 1080p, 420 | 4.03 | 3.44/85 | 3.24/80 |
| Netflix Boat, 1080p, 420 | 4.63 | 3.21/69 | 3.10/67 |
| Rush Hour, 1080p, 420 | 1.32 | 1.13/86 | 1.03/78 |
| Touchdown Pass, 1080p, 420 | 3.14 | 2.44/78 | 2.40/77 |
| Run-time (in Percent) | 100% | 85.63% | 78.13% |

Based on the experimental statistics, the reduced IBC search method provides an overall average encoder speed increase of about 15% when compared to the current latest AV1. The improvements in speed are higher in natural video (about 21%) since they have lesser IBC winners, and therefore, the adaptive, reduced search method results in a relatively small IBC search space and much smaller IBC searches as opposed to the conventional brute-force unrestricted search. Screen content, on the other hand, has more chances of having IBC winners, and hence has only about an 8% speed increase.

To further explore the opportunity to increase the speed of the encoder, the IBC block-size restriction was introduced to drop IBC block sizes larger than the 32×32 during the IBC search, where only sub-divisions of the larger block were considered. This restriction significantly increases the speed of the encoder for webpage and/or text screen content due to the increased IBC searches typical of this content. To summarize, the block-size restriction adds another about 7% encoder speed increase on average among the content being tested.

Overall, by one form, with the reduced IBC search, the encoder experiences simplified and/or restricted IBC searches executed only in the identified potential regions mapped by the dynamic search internal buffer, thereby reducing execution time (by an average of up to 22%) across natural video and screen content. Otherwise, the BD-Rate improvements reach about 1% for natural video content, which is actually a large increase for compression or coding systems. For an AV2 standard, this system can see significant quality gains for natural content with IBC as a default coding tool and speed increase gains across all content types.

While any implementation of the example processes or systems herein may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

The terms "circuit" or "circuitry," as used in any implementation herein, may comprise or form, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor ("processor circuitry") and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other implementations may be implemented as software executed by a programmable control device. In such cases, the terms "circuit" or "circuitry" are intended to include a combination of software and hardware such as a programmable control device or a processor capable of executing the software. As described herein, various implementations may be implemented using hardware elements, software elements, or any combination thereof that form the circuits, circuitry, processor circuitry. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Figure 8:
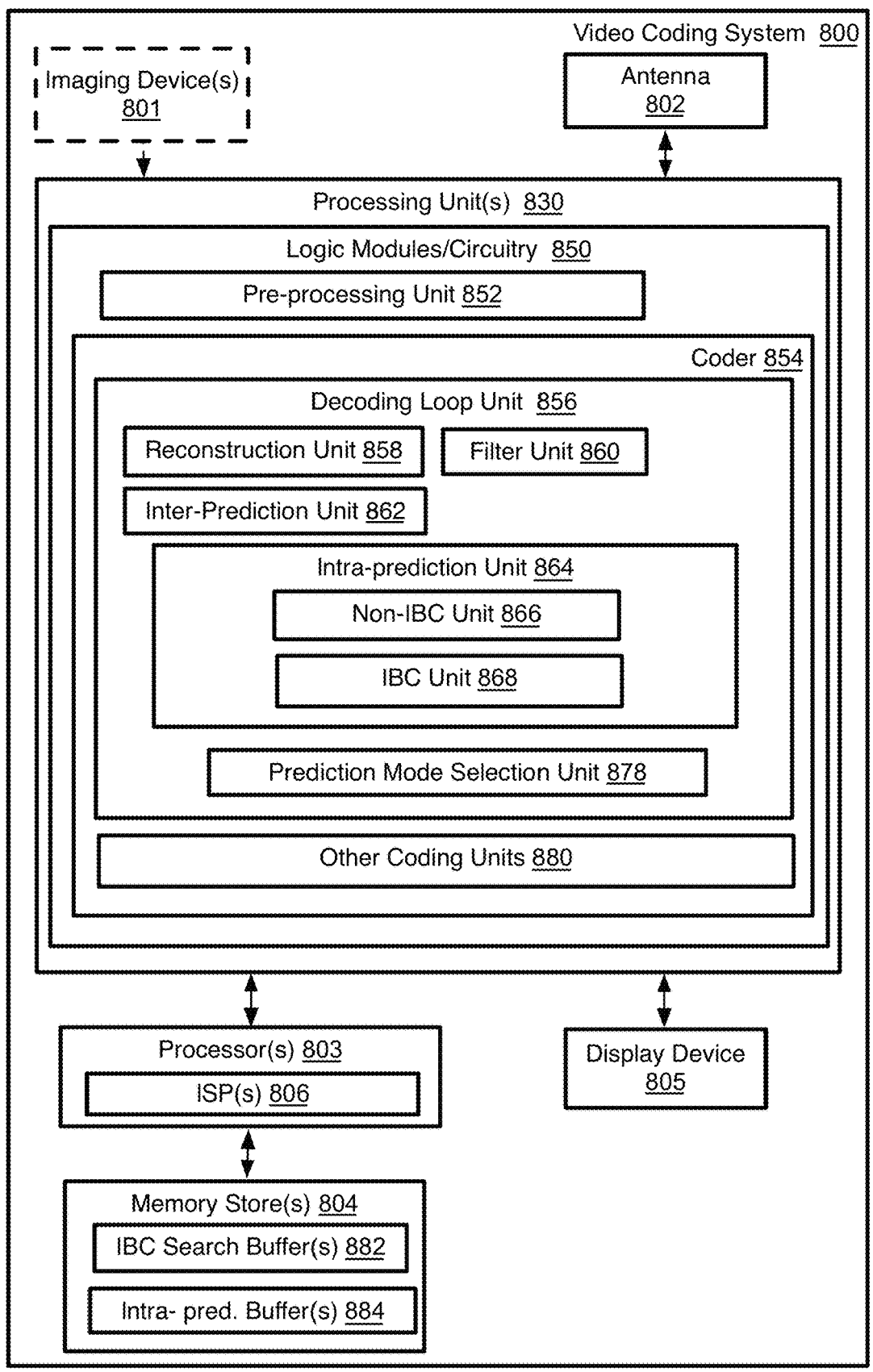
FIG. 8 is an illustrative diagram of an example system.

Referring to FIG. 8, an example image processing system (or video coding system) 800 for providing video coding with efficient intra block copying may be arranged in accordance with at least some implementations of the present disclosure. In the illustrated implementation, system 800 may include one or more processor(s) 803, processing unit(s) 830 to provide the encoder and decoder discussed herein, optionally one or more imaging devices 801 to capture images, an antenna 802 to receive or transmit image data, a display device 805, and one or more memory stores 804. Processor(s) 803, memory store 804, and/or display device 805 may be capable of communication with one another, via, for example, a bus, wires, or other access. In various implementations, display device 805 may be integrated in system 800 or implemented separately from system 800.

As shown in FIG. 8, and discussed above, the processing unit(s) 830 may have logic modules or circuitry 850 with a pre-processing unit 852 that modifies image data for coding, and a coder 854 that could be or include an encoder 100. Relevant here, the coder 854 may have a decoding loop unit 856 with a reconstruction unit 858 to reconstruct transformed and quantized image data, a filter unit 860 to refine the reconstructed image data, an inter-prediction unit 862, and an intra-prediction unit 864. The intra-prediction unit 864, the same or similar to intra predictor unit 124 (FIG. 1), may have a non-IBC unit 866 (or 128) that generates spatial prediction candidates, such as horizontal or DC, for intra-prediction modes, and an IBC unit 868 (or 130) that performs the reduced IBC searching for intra prediction disclosed herein and described above. A prediction mode selection unit 878 may select the prediction mode that is used to generate a residual to modify the original data and for compression. The coder 854 also may have other coding units 880 which may include video coding units not mentioned including any or all of the other units of the encoder 100 described above for example. All of these perform the tasks as described in detail above and as the title of the unit or module suggests. It also will be understood that much or all of intra-prediction unit 864 may be provided on, or operated by, a decoder 200 when desired.

As will be appreciated, the modules (or circuits) illustrated in FIG. 8 may include a variety of software and/or hardware modules and/or modules that may be implemented via software or hardware or combinations thereof. For example, the modules may be implemented as software via processing units 830 or the modules may be implemented via a dedicated hardware portion. Also, system 800 may be implemented in a variety of ways. For example, system 800 (excluding display device 805) may be implemented as processor circuitry with a single chip or device having an accelerator or a graphics processor unit (GPU) which may or may not have image signal processors (ISPs) 806, a quad-core central processing unit, and/or a memory controller input/output (I/O) module. In other examples, system 800 (again excluding display device 805) may be implemented as a chipset or a system on a chip (SoC). It will be understood antenna 802 could be used to receive image data for encoding as well.

Otherwise, processor(s) (or processor circuitry) 803 may include any suitable implementation including, for example, central processing units (CPUs), microprocessor(s), multi-core processors, application specific integrated circuits, chip(s), chipsets, programmable logic devices, graphics cards, integrated graphics, general purpose graphics processing unit(s), fixed function GPUs such as image signal processors (ISPs) 806, digital signal processor(s) (DSPs), and so forth, SoCs, other accelerators, or the like.

In addition, memory stores 804 may store the IBC search buffer(s) 882 as described above and may have intra-prediction buffers 884 to store either a version of original image data or reconstructed (decoded) image data to form the reference frame and/or source or current blocks on the current frame if needed and that can be used to reconstruct the image blocks of a frame depending. The memory stores 804 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 804 also may be implemented via cache memory.

In various implementations, the example video coding system 800 may use the imaging device 801 to form or receive natural captured image data, while synthetic images may be received from the camera, a memory, or via transmission to the system 800. Thus, the system 800 may receive screen content through the camera, antenna 802, or other wired connection. The camera can be implemented in various ways. Thus, in one form, the image processing system 800 may be one or more digital cameras or other image capture devices, and imaging device 801, in this case, may be the camera hardware and camera sensor software, module, or component. In other examples, video coding system 800 may have an imaging device 801 that includes or may be one or more cameras, and logic modules 850 may communicate remotely with, or otherwise may be communicatively coupled to, the imaging device 801 for further processing of the image data.

Thus, video coding system 800 may be, or may be part of, or may be in communication with, a smartphone, tablet, laptop, or other mobile device such as wearables including smart glasses, smart headphones, exercise bands, and so forth. In any of these cases, such technology may include a camera such as a digital camera system, a dedicated camera device, or an imaging phone or tablet, whether a still picture or video camera, camera that provides a preview screen, or some combination of these. Thus, in one form, imaging device 801 may include camera hardware and optics including one or more sensors as well as auto-focus, zoom, aperture, ND-filter, auto-exposure, flash, and actuator controls. The imaging device 801 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. In other examples, an RGB-Depth camera and/or microphone-array might be used in addition to or in the alternative to a camera sensor. In some examples, imaging device 801 may be provided with an eye tracking camera. Otherwise, the imaging device 801 may be any other device that records, displays or processes digital images such as video game panels or consoles, set top boxes, and so forth.

As illustrated, any of these components may be capable of communication with one another and/or communication with portions of logic modules 850 and/or imaging device 801. Thus, processors 803 may be communicatively coupled to both the image device 801 and the logic modules 850 for operating those components. Although image processing system 800, as shown in FIG. 8, may include one particular set of blocks or actions associated with particular components or modules, these blocks or actions may be associated with different components or modules than the particular component or module illustrated here.

Figure 9:
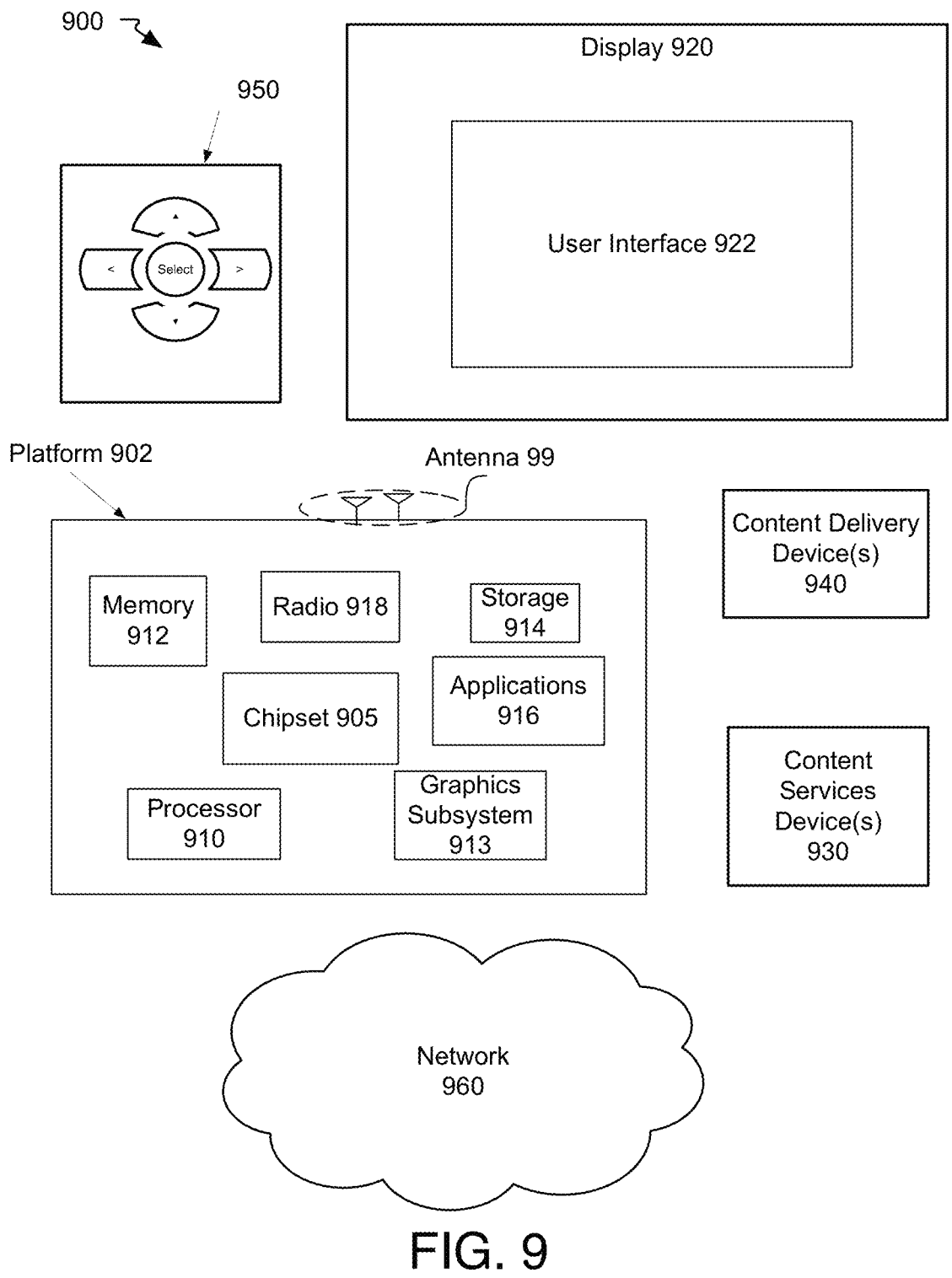
FIG. 9 is an illustrative diagram of another example system.

Referring to FIG. 9, an example system 900 in accordance with the present disclosure and various implementations may embody system 800 for example. For example, system 900 may be incorporated into one or more servers, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet. Smart speaker, or smart television), mobile internet device (MID), messaging device, data communication device, and so forth.

In various implementations, system 900 includes a platform 902 communicatively coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 913, applications 916 and/or radio 918 as well as antenna(s) 911. Chipset 905 may provide intercommunication among processor 910, memory 912, storage 914, graphics subsystem 913, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 913 may perform processing of images such as still or video for display. Graphics subsystem 913 may be a graphics processing unit (GPU) or a visual processing unit (VPU), for example. An analog or digital interface may be used to communicatively couple graphics subsystem 913 and display 920. For example, the interface may be any of a High-Definition Multimedia Interface, Display Port, wireless HDMI, and/or wireless HD compliant techniques. Graphics subsystem 913 may be integrated into processor 910 or chipset 905. In some implementations, graphics subsystem 913 may be a stand-alone card communicatively coupled to chipset 905.

The graphics and/or video processing techniques described herein may be implemented in various hardware architectures including fixed function hardware such as video motion estimation (VME) engines or similar parallel processing circuits. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/or display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In implementations, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In implementations, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902 and display 920 may be an integrated unit. Display 920 and content service device(s) 930 may be integrated, or display 920 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
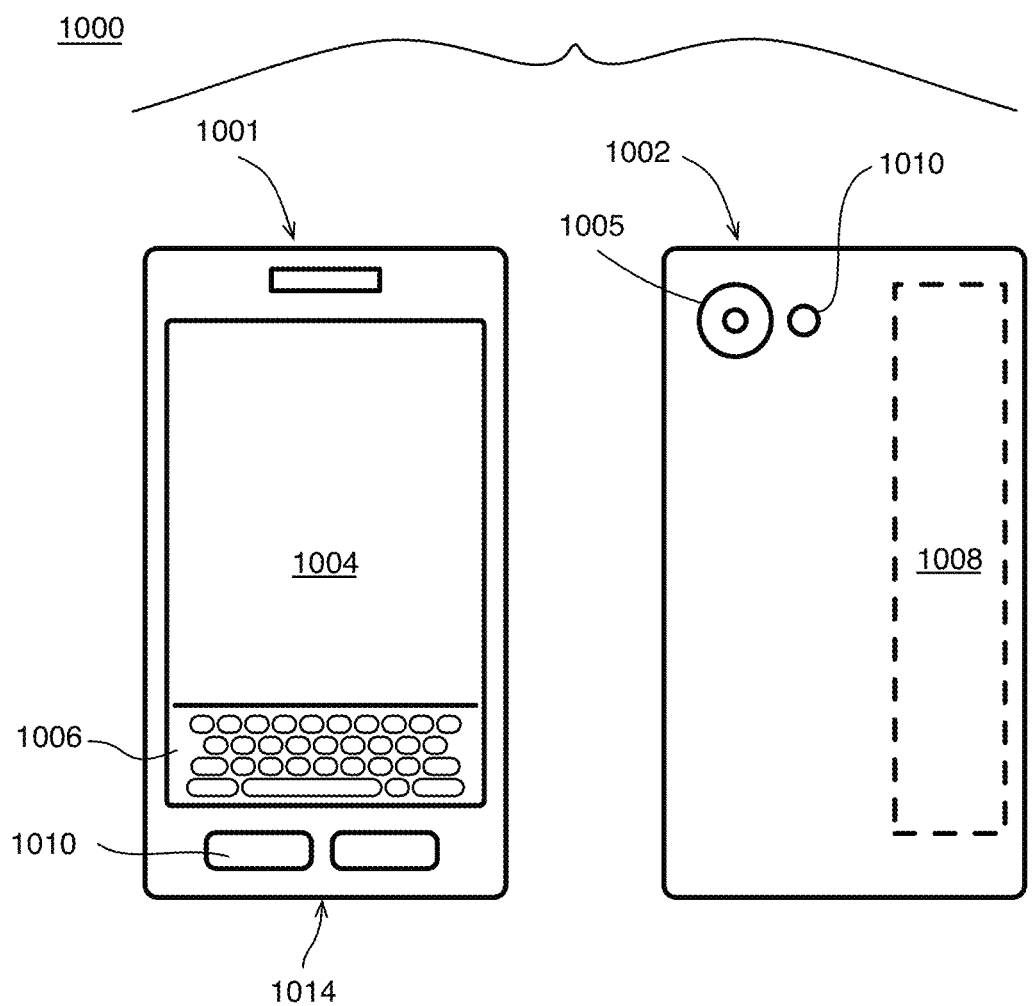
FIG. 10 illustrates another example device, all arranged in accordance with at least some implementations of the present disclosure.

Referring to FIG. 10, a small form factor device 1000 is one example of the varying physical styles or form factors in which systems 800 or 900 may be embodied. By this approach, device 1000 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The implementations are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone 1014, or may be digitized by a voice recognition device. As shown, device 1000 may include a camera 1005 (e.g., including at least one lens, aperture, and imaging sensor) and a flash 1010 integrated into back 1002 (or elsewhere) of device 1000. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By an example one or more first implementations, a computer-implemented method of video coding comprises obtaining image data of at least one frame of a video sequence; and decoding a current block of image data on the at least one frame comprising: selecting previously decoded reference blocks of the at least one frame at least partly depending on a type of prediction mode that was used to decode the previously decoded reference blocks and selected to include in an intra block copy (IBC) search space, and performing the IBC search only on the selected previously decoded reference blocks.

By an example second implementation, and further to the first implementation, wherein the types of prediction modes that indicate inclusion of a previously decoded reference block in the IBC search space are generally considered the n-most automatically selected prediction modes during coding used to decode substantially synthetic images and available in a video coding standard being used to decode the at least one frame.

By an example third implementation, and further to the first implementation, wherein the types of prediction modes that indicate inclusion of a previously decoded reference block in the IBC search space are generally considered the n-most automatically selected prediction modes during coding used to decode substantially synthetic images and available in a video coding standard being used to decode the at least one frame, and wherein the n-most refers to the normally two most used prediction modes of reference blocks to be included in the IBC search.

By an example fourth implementation, and further to any one of the first to third implementation, wherein the type of prediction mode is an IBC mode.

By an example fifth implementation, and further to any one of the first to fourth implementation, wherein the type of prediction mode is a palette mode.

By an example sixth implementation, and further to any one of the first to fifth implementation, wherein the previously decoded reference blocks are included in the IBC search space regardless of the image data content of the reference blocks.

By an example seventh implementation, and further to any one of the first to sixth implementation, wherein the previously decoded reference blocks are included in the IBC search space regardless of the position of the previously decoded reference blocks on the at least one frame excluding any super block spaces immediately to the left of the super block space of the current block that does not have image data decoded in time to be used as a reference block for the current block.

By an example eighth implementation, and further to any one of the first to seventh implementation, the method comprising limiting the size of the current and reference blocks to be matched during the IBC search to those sizes most likely to use the IBC search as the selected prediction mode.

By an example ninth implementation, and further to any one of the first to seventh implementation, the method comprising limiting the size of the current and reference blocks to be matched during the IBC search to those sizes most likely to use the IBC search as the selected prediction mode, and wherein the current and reference blocks are limited to a maximum of about 32×32 pixels.

By an example one or more tenth implementation, a computer-implemented system comprises memory to store compressed image data of at least one frame of a video sequence; and processor circuitry forming at least one processor communicatively coupled to the memory, the at least one processor being arranged to operate by: decoding a current block of image data on the at least one frame comprising: selecting previously decoded reference blocks of the at least one frame depending at least partly on a type of prediction mode that was used to decode the previously decoded reference blocks and selected to include in an intra block copy (IBC) search space, and performing the IBC search only on the selected previously decoded reference blocks.

By an example eleventh implementation, and further to the tenth implementation, wherein the at least one processor operates by listing blocks in a buffer that indicate whether or not a previously decoded block is to be included in the IBC search space for the at least one frame.

By an example twelfth implementation, and further to the tenth implementation, wherein the at least one processor operates by listing blocks in a buffer that indicate whether or not a previously decoded block is to be included in the IBC search space for the at least one frame, and wherein the buffer lists the blocks in an order to set the frame location of the blocks, and provides a bit of each block indicating whether or not the block is included in the search space.

By an example thirteenth implementation, and further to the tenth implementation, wherein the IBC search space is grown by adding a sub-division block to the IBC search space that is the largest available sub-division of a super-block and added when the sub-division block is the current block or the current block is within the sub-division block and was decoded by using one or more of the predetermined prediction modes indicating inclusion of the current block into the IBC search space.

By an example fourteenth implementation, and further to the tenth implementation, wherein the IBC search space is grown by adding a sub-division block to the IBC search space that is the largest available sub-division of a super-block and added when the sub-division block is the current block or the current block is within the sub-division block and was decoded by using one or more of the predetermined prediction modes indicating inclusion of the current block into the IBC search space, and wherein the super-block is 128×128 pixels and the sub-division is 64×64 pixels.

By an example fifteenth implementation, and further to the tenth implementation, wherein the IBC search space is grown by adding a sub-division block to the IBC search space that is the largest available sub-division of a super-block and added when the sub-division block is the current block or the current block is within the sub-division block and was decoded by using one or more of the predetermined prediction modes indicating inclusion of the current block into the IBC search space, and wherein the super-block is 64×64 pixels and the sub-division is 32×32 pixels.

By an example sixteenth implementation, and further to the tenth implementation, wherein the types of prediction modes comprises an IBC prediction mode and a palette prediction mode.

By one or more example seventeenth implementation, a video encoder comprises processor circuitry forming a decoding loop to generate intra-predictions, wherein the processor circuitry being arranged to operate by decoding a current block of image data on the at least one frame comprising: selecting previously decoded reference blocks of the at least one frame depending at least partly on a type of prediction mode that was used to decode the previously decoded reference blocks and selected to include in an intra block copy (IBC) search space, and performing the IBC search only on the selected previously decoded reference blocks.

By an example eighteenth implementation, and further to the seventeenth implementation, wherein the types of prediction modes comprises an IBC prediction mode and a palette prediction mode.

By an example nineteenth implementation, and further to the seventeenth or eighteenth implementation, wherein the processor circuitry is arranged to operate by transmitting the selected prediction modes to a decoder without a need to define the IBC search space for a decoder.

By one or more example twentieth implementations, at least one article comprising at least one non-transitory computer-readable medium having instructions stored thereon that when executed cause a computing device to operate by: obtaining image data of at least one frame of a video sequence; and decoding a current block of image data on the at least one frame comprising: selecting previously decoded reference blocks of the at least one frame depending at least partly on a type of prediction mode that was used to decode the previously decoded reference blocks and selected to include in an intra block copy (IBC) search space, and performing the IBC search only on the selected previously decoded reference blocks.

By an example twenty-first implementation, and further to the twentieth implementation, wherein the types of prediction modes that indicate inclusion of a previously decoded reference block in the IBC search space are generally considered the n-most automatically selected prediction modes during decoding of substantially synthetic images and available in a video coding standard being used to decode the at least one frame.

By an example twenty-second implementation, and further to the twentieth or twenty-first implementation, wherein the types of prediction modes comprises an IBC prediction mode and a palette prediction mode.

By an example twenty-third implementation, and further to any one of the twentieth to twenty-second implementation, wherein the instructions are arranged to cause the computing device to operate by growing the IBC search space by adding sub-division of super-blocks at a time rather than adding an entire super-block at a time.

By an example twenty-fourth implementation, and further to any one of the twentieth to twenty-third implementation, wherein the instructions are arranged to cause the computing device to operate by growing the IBC search space by adding a sub-division block to the IBC search space that is the largest available sub-division of a super-block and added when the sub-division block is the current block or the current block is within the sub-division block and was decoded by using one or more of the prediction modes indicating inclusion of the current block into the IBC search space.

By an example twenty-fifth implementation, and further to any one of the twentieth to twenty-fourth implementation, wherein the instructions are arranged to cause the computing device to operate by restricting the current block and the reference block to be matched to the current block to be a maximum of 32×32 pixels.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of video coding, comprising:
    obtaining image data of at least one frame of a video sequence; and
    decoding a first block of the at least one frame, the decoding comprising:
        determining an intra block copy (IBC) search space which corresponds to the first block, comprising:
            for each block of a first one or more blocks which were decoded prior to the first block, selecting the block to be included as a respective reference block of an IBC search space based on an indication that the block was previously decoded according to a respective prediction mode of one or more prediction modes comprising an IBC mode; and
            for each block of a second one or more blocks which were decoded prior to the first block, selecting the block to be excluded from the IBC search space based on an indication that the block was previously decoded according to a respective prediction mode other than any of the one or more prediction modes; and
        performing an IBC search of only the IBC search space.

2. The computer-implemented method of claim 1 wherein determining the IBC search space further comprises:
    excluding one or more super blocks of the at least one frame from the IBC search space based on a failure of the one or more super blocks to be decoded in time for the decoding of the first block.

3. The computer-implemented method of claim 1 wherein the one or more prediction modes further comprise a palette mode.

4. The computer-implemented method of claim 1 wherein, for each block of the first one or more blocks, the block is selected to be included as the respective reference block of the IBC search space independent of the respective image data of the block.

5. The computer-implemented method of claim 1 wherein:
    for each block of the first one or more blocks, the block is selected to be included as the respective reference block of the IBC search space independent of a position of the block in the at least one frame; and
    determining the IBC search space further comprises:
        excluding one or more super blocks of the at least one frame from the IBC search space based on a failure of the one or more super blocks to be decoded in time to be used in the decoding of the first block.

6. The computer-implemented method of claim 1, further comprising limiting a size of the first block and of reference blocks of the IBC search space based on a correspondence of a first one or more block sizes with a likelihood of a selection of the IBC mode.

7. The computer-implemented method of claim 6 wherein the first block and the reference blocks are limited to a maximum of 32×32 pixels.

8. A computer-implemented system comprising:
memory to store compressed image data of at least one frame of a video sequence; and
processor circuitry forming at least one processor communicatively coupled to the memory, the at least one processor being arranged to operate by:
decoding a first block of the at least one frame, the decoding comprising:
determining an intra block copy (IBC) search space which corresponds to the first block, comprising:
for each block of a first one or more blocks which were decoded prior to the first block, selecting the block to be included as a respective reference block of an IBC search space based on an indication that the block was previously decoded according to a respective prediction mode of one or more prediction modes comprising an IBC mode; and
for each block of a second one or more blocks which were decoded prior to the first block, selecting the block to be excluded from the IBC search space based on an indication that the block was previously decoded according to a respective prediction mode other than any of the one or more prediction modes; and
performing an IBC search of only the IBC search space.

9. The computer-implemented system of claim 8 wherein the at least one processor operates by listing blocks in a buffer to indicate whether or not a previously decoded block is to be included in the IBC search space.

10. The computer-implemented system of claim 9 wherein the buffer lists bits which each correspond to a different respective block, the bits arranged according to an order of the blocks in the frame, and wherein the bits each indicate whether or not the corresponding block is included in the IBC search space.

11. The computer-implemented system of claim 8 wherein the IBC search space is to be grown by an addition of a sub-division block to the IBC search space that is a largest available sub-division of a super-block, the addition when the sub-division block is a current block or when the current block is within the sub-division block and was decoded according to a respective prediction mode of the one or more prediction modes.

12. The computer-implemented system of claim 11 wherein a size of the super-block is 128×128 pixels and a size of the sub-division block is 64×64 pixels.

13. The computer-implemented system of claim 11 wherein a size of the super-block is 64×64 pixels and a size of the sub-division block is 32×32 pixels.

14. The computer-implemented system of claim 8 wherein the one or more prediction modes further comprises a palette mode.

15. A video encoder comprising:
processor circuitry to perform a decoding loop to generate intra-predictions, wherein the processor circuitry is to decode a first block of at least one frame of a video sequence, comprising the processor circuitry to:
determine an intra block copy (IBC) search space which corresponds to the first block, comprising the processor circuitry to:
for each block of a first one or more blocks which were decoded prior to the first block, select the block to be included as a respective reference block of an IBC search space based on an indication that the block was previously decoded according to a respective prediction mode of one or more prediction modes comprising an IBC mode; and
for each block of a second one or more blocks which were decoded prior to the first block, select the block to be excluded from the IBC search space based on an indication that the block was previously decoded according to a respective prediction mode other than any of the one or more prediction modes; and
perform an IBC search of only the IBC search space.

16. The video encoder of claim 15, wherein the one or more prediction modes further comprise a palette mode.

17. The video encoder of claim 15, wherein the processor circuitry is to transmit the one or more prediction modes to a decoder independent of any need to define the IBC search space to the decoder.

18. At least one article comprising at least one non-transitory computer-readable medium having instructions stored thereon that when executed cause a computing device to operate by:
obtaining image data of at least one frame of a video sequence; and
decoding a first block of the at least one frame, the decoding comprising:
determining an intra block copy (IBC) search space which corresponds to the first block, comprising:
for each block of a first one or more blocks which were decoded prior to the first block, selecting the block to be included as a respective reference block of an IBC search space based on an indication that the block was previously decoded according to a respective prediction mode of one or more prediction modes comprising an IBC mode; and
for each block of a second one or more blocks which were decoded prior to the first block, selecting the block to be excluded from the IBC search space based on an indication that the block was previously decoded according to a respective prediction mode other than any of the one or more prediction modes; and
performing an IBC search of only the IBC search space.

19. The at least one article of claim 18 wherein the determining the IBC search space further comprises:
excluding one or more super blocks of the at least one frame from the IBC search space based on a failure of the one or more super blocks to be decoded in time for the decoding of the first block.

20. The at least one article of claim 18 wherein the one or more prediction modes further comprise a palette mode.

21. The at least one article of claim 18 wherein the instructions are arranged to cause the computing device to operate by growing the IBC search space by adding one super-block sub-division at a time rather than adding an entire super-block at a time.

22. The at least one article of claim 18 wherein the instructions are arranged to cause the computing device to operate by growing the IBC search space by adding a sub-division block to the IBC search space that is a largest available sub-division of a super-block, the adding when the sub-division block is a current block or when the current block is within the sub-division block and was decoded according to a respective prediction mode of the one or more of the prediction modes.

23. The at least one article of claim 18 wherein the instructions are arranged to cause the computing device to operate by restricting the first block and a reference block each to be a maximum of 32×32 pixels.

* * * * *